(12) United States Patent
Kawabata et al.

(10) Patent No.: US 6,537,602 B1
(45) Date of Patent: Mar. 25, 2003

(54) CHOCOLATE COMPOSITIONS AND UTILIZATION THEREOF

(75) Inventors: Yasushi Kawabata, Izumisano (JP); Kazutoshi Morikawa, Ibaraki (JP); Satoko Nakajima, Izumisano (JP); Fumiko Shiota, Izumisano (JP); Akira Kurooka, Izumisano (JP); Yoshio Yamawaki, Ibaraki (JP); Koji Umeno, Ibaraki (JP); Makoto Kobayashi, Ibaraki (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 09/555,631

(22) PCT Filed: Oct. 6, 1999

(86) PCT No.: PCT/JP99/05524

§ 371 (c)(1),
(2), (4) Date: Jun. 2, 2000

(87) PCT Pub. No.: WO00/19834

PCT Pub. Date: Apr. 13, 2000

(30) Foreign Application Priority Data

| Oct. 8, 1998 | (JP) | 10-287031 |
| Jan. 12, 1999 | (JP) | 11-005761 |
| Mar. 18, 1999 | (JP) | 11-073463 |
| Mar. 24, 1999 | (JP) | 11-079679 |

(51) Int. Cl.$^7$ .............................................. A21D 13/00
(52) U.S. Cl. ....................... 426/283; 426/496; 426/660; 426/631; 426/94
(58) Field of Search ................................ 426/496, 660, 426/631, 658, 549, 94, 183

(56) References Cited

U.S. PATENT DOCUMENTS 4,209,536 A * 6/1980 Dogliotti ...................... 426/94
5,370,888 A * 12/1994 Nachiya ...................... 426/282

FOREIGN PATENT DOCUMENTS

| JP | 55-9174 B2 | 3/1980 |
| JP | 62-122557 | 6/1987 |

OTHER PUBLICATIONS

Knox, Gerlad. 1983. Cookies for kids. Better Homes and Gardens. 14.*
Rombauer, I. S. and Becker, M. R. 1953. Joy of Cooking. A Plume Book. 591, 593–595.*
Morgan, 1982. Chocolate and Candy Cookbook. ARCO Publishing, Inc., New York, pp. 67, 69–71, 99, 100.*
Barnett, 1978. The Art & Science of Candy Manufacturing. Books for Industry, New York, pp. 94, 95, 147–153, 156–158.*
Beranbaum, 1994. Drop–Dead Dessert's Secret, St Louis Post–Dispatch. Mar. 28, 1994, p. 4.*
Kimura (editor), Brownie Recipe. Cakes And Chocolates For Gifts, Jan. 10, 1983, p. 22, published by Shufunoto-mo–sha (Japan).
France, Nut and Chocolate Chip Brownie Recipe, Chocolate Ecstasy, 1996, p. 20, published by Lorenz–Books (UK).
Olney, Chocolate Shortbread Recipe, The Joy Of Chocolate, 1982, p. 104, published by Barron's (US).

* cited by examiner

*Primary Examiner*—Carolyn Paden
(74) *Attorney, Agent, or Firm*—Shinjyu Intellectual Property Firm

(57) ABSTRACT

The present invention provides a ganache-type chocolate composition outstanding in inclusion (mechanical) fitness when contained in confectionery dough, and moreover having good baking tolerance. The chocolate composition includes 1 to 30 wt. % non-fat cacao part, 10 to 50 wt. % fats/oils, 4 to 40 wt. % moisture and by anhydride conversion, 0.2 to 10 wt. % heat-coagulating proteins, and is in non-liquid at 5° C. Chocolate confectionery may be easily manufactured by including or coating this chocolate composition in/on other confectionery dough. Moreover, separately baking the chocolate composition itself can provide chocolate confectionery having new tastes/textures.

14 Claims, No Drawings

CHOCOLATE COMPOSITIONS AND UTILIZATION THEREOF

TECHNICAL FIELD

The present invention relates to chocolate compositions; in particular it relates to oil-in-water type water-containing chocolate compositions referred to as ganache-type, and to uses thereof.

CONVENTIONAL ART

Oil-in-water type water-containing chocolate compositions (which in general are called "ganaches"), manufactured by mixing chocolate foodstuff with moisture in for example creams, are used as high-grade confectionery materials. Ganaches may be used for napping cakes (i.e., coating onto cake surfaces with a spatula), for flower-making using confectionery tools, or they may be sandwiched between tortes.

Nevertheless, problems with conventional ganaches have been pointed out, such as the following.

In the first place, baking in an oven conventional ganache set or applied onto the surface of butter-cakes/cookies, for example, risks the ganache boiling and flowing away. In the second place, there is a risk that baking cakes in which the interior is filled with conventional ganaches might create a large cavity against the upper part of the filling and gush the ganache out.

Due to such problems, conventional ganaches are generally coated on or filled into cakes/cookies after baking. Though in fact in some instances ganaches are, notwithstanding, used in cakes/cookies prior to baking, such cases require extraordinarily high-level techniques in which the ganache is frozen, molded into balls, and carefully embedded into cookie/cake dough. Moreover, because the frozen ganache becomes fluid and peripherally sticky with elevation in temperature, which furthermore significantly deteriorates its baking tolerance, it is difficult to handle.

Taking into account these problematic points, various types of ganache have been proposed conventionally. For instance, Japanese Laid-Open Pat. App. No. 3-198742 proposes a method for manufacturing chocolate mousse using whipped-egg-white meringue and a specified amount of xanthan gum. In addition, Japanese Laid-Open Pat. App. No. 4-95447 proposes a very emulsification-stabilized chocolate composition in which polyglycerin fatty acid ester is employed as an emulsifier. Each of these, however, is inferior in baking tolerance, and neither sufficiently resolves the conventional problems.

Now, general conventional chocolates have rich cacao flavors and snap, and characteristically dissolve by melting rapidly within the mouth. In addition there are chocolates of somewhat inferior cacao flavor richness, in which the non-tempered line of hard butters are used as fat/oil components (i.e., quasi-chocolates under the Japanese standard). Many among the chocolates that are ranked quasi-chocolates also have the just-noted snap and dissolving characteristics, in that they melt rapidly within the mouth.

Lately, however, to suit consumer preference development of chocolates having taste and texture different from conventional chocolates is anticipated.

The present invention is ganache-type chocolate compositions presenting flavors having a high-grade sense and which are smooth to the palate. The invention offers chocolate compositions having excellent inclusion characteristics, and baking tolerance, steam-cooking tolerance, or frying tolerance when included in confectionery dough during chocolate confectionary manufacture, and offers uses thereof. Also, the present invention provides chocolate confectionary of new tastes and texture that have not existed before.

DISCLOSURE OF THE INVENTION

As a result of concerted investigation to achieve the foregoing objects, the present inventors found that the problems noted above may be resolved by water-containing chocolates obtained by adding a specified proportion of heat-coagulating protein and/or starchy ingredient(s) to a mixture in which a specified proportion moisture is mixed into a chocolate foodstuff including non-fat cacao in part and fats/oils.

Further, it was discovered that by baking such chocolate compositions themselves, the light crispy taste and texture of baked confectionary is imparted even to the chocolate compositions.

That is, the gist of the present invention is oil-in-water, water-containing chocolate compositions that are: moisture, and heat-coagulating protein and/or starchy ingredient(s) added to predetermined chocolate foodstuff. The present invention then relates to uses of chocolate compositions wherein chocolate confectioneries are manufactured by setting/coating the chocolate compositions onto, or including them into, confectionary dough, and to uses wherein chocolate confectioneries are manufactured by cooking the chocolate compositions directly.

BEST MODE FOR EMBODYING THE INVENTION

First Embodiment

Components and Methods

The chocolate composition in the first embodiment includes 1 to 30 wt. % non-fat cacao part, 10 to 50 wt. % fats/oils, 4 to 40 wt. % moisture, and 0.2 to 10 wt. %, by anhydride conversion, heat-coagulating protein (weight percents are with respect to the entire chocolate composition). And its non-liquid state is at 5° C.

The non-fat cacao part means a portion of the solid components derived from cacao bean from which cocoa butter is excluded. Cacao mass, cacao, various chocolate foodstuff made by these materials, and all of processed products thereof may be used for the non-fat cacao components. It is suitable that the amount of the non-fat cacao components is between 1 and 30 wt. %, preferably between 2 and 15 wt. %, with respect to the entire amount of the food product. Less than the lower limit does not yield the so-called ganache-like body exhibiting plasticity; surpassing the upper limit very much raises the viscosity, making production difficult.

The moisture may simply be water, or may be derived from the heat-coagulating protein. Preferable examples are: moisture in which powdered skim milk or non-fat powdered milk is dissolved or dispersed in water; natural fresh creams; milk; condensed milk; moisture containing dairy constituents such as synthetic creams in which animal and vegetable fats and oils that have been conventionally developed are used; or moisture containing saccharides. The amount of moisture suitably is 4 to 40 wt. %, preferably 15 to 25 wt. %, with respect to the gross weight of the chocolate composition. At less than the lower limit, oil-in-water type emulsification, or even mimicking emulsions in which emulsification is not perfect, are difficult; exceeding the upper limit makes it difficult to gain the so-called ganache-like body in which plasticity is exhibited.

The heat-coagulating proteins are essential components for imparting satisfactory baking tolerance to the applicable food products. The protein is contained, with respect to the food item gross weight, at 0.2 to 10 wt. %, preferably 0.5 and 3.5 wt. %, by anhydride conversion. Albumen is illustrative of the protein. Such albumen may be fresh egg whites, in which the moisture is contained, or those that are frozen, or concentrates. Or it may be dehydrated egg whites from which the moisture has been removed. If the amount of these heat-coagulating proteins is at less than the lower limit, sufficient baking tolerance will not be obtained, and if it surpasses the upper limit, strong effects on the heat-coagulating proteins themselves appear, and the flavors and texture of the food items deteriorate, spoiling their commercial value.

"Fats/oils," as the fat/oil ingredient, include vegetable fats/oils such as: rape oil, sunflower seed oil, cottonseed oil, peanut oil, rice bran oil, corn oil, safflower oil, olive oil, kapok oil, sesame oil, evening primrose oil, palm oil, shea oil, sal oil, cacao oil, coconut oil, and palm kernel oil; and animal fats/oils such as milk fat, tallow, lard, fish oil, and whale oil. Single oils or mixed oils from these fats/oils may be used; and processed fats/oils produced from these by hardening, fractionating, or ester exchange may also be used. Moreover, commercially available butters, margarines, shortenings or hard butters may be used. The quantity of the fats/oils is 10 to 50 wt. %, preferably 15 to 40 wt. %, with respect to the chocolate composition gross weight. With amounts less than the lower limit, the so-called ganache-like body in which satisfactory plasticity is exhibited is difficult to gain; surpassing the upper limit gives rise to the separation of the oil part.

It should be noted that one, two or more emulsifiers such as lecithins, sucrose-fatty acid esters, polyglycerin fatty acid esters, sorbitan fatty acid esters, and mono-glycerides can be added, as needed, in order to obtain a stable emulsions. Also, fruit juices or various liquors for flavoring and preservation may be added, or sweetening agents such as starch syrup may be added to adjust the sweetness. Furthermore, gums, for example xanthan gum, locust bean gum, guar gum, and gum arabic, furcellaran, CMC, micro-crystalline cellulose, pectin, agar, carrageenan, and gelatins may be added as a stabilizers according to need.

The chocolate compositions are manufactured as follows.

Initially, the moisture is heated to 65 to 70° C., whereupon a chocolate foodstuff into which fats/oils have been melted is added by stirring in; further it is emulsified and cooled. Prior to the emulsifying step or homogenizing step, disinfecting or sterilizing may be done. As stirring methods herein, either a gentle by-hand stirring procedure, or a high-speed stirring system capable of applying strong shear forces (e.g., a stirring system in which the "Homomixer" [Tokushukika Kogyo, Ltd., mfr.] or the like is employed) may be used. A homogenizing process (5 to 150 Kg/cm$^2$) may be carried out as needed.

EXAMPLES

Embodiments and comparative examples are set out below to explain the first embodiment. These are merely illustrative examples, and of course do not limit the present invention. Note that, as a general rule, both "parts" and "%" mean on a weight basis.

Embodiment 1

30 parts commercially available non-dairy cream ("Fuji Sunny Topping 200," Fuji Oil Co., Ltd., mfr.) and 10 parts raw egg white were mixed and heated to 65° C. 60 parts commercially available sweet chocolate foodstuff of 33% oil part ("Fuji Sunny Sweet Chocolate," Fuji Oil Co., Ltd., mfr.) were added, and two-minute manual stirring at 65° C. with a spatula was performed to stir-emulsify. Afterwards the mixture was cooled to 35° C. The constituents of the chocolate composition thus obtained are as follows.

| Constituent | (%) |
| --- | --- |
| Non-fat cacao part | 10.8 |
| Oil part | 33.3 |
| Moisture | 23.8 |
| Egg white (dehydrated conversion) | 1.2 |
| Remainder (sugars, non-fat milk solids, etc.) | 30.9 |

The chocolate composition had a smooth texture and solidified when cooled to 5° C. The chocolate composition was included in butter cake dough and baked (180° C., 15 min.) in an oven. The involved chocolate composition did not gush out nor deform, enabling the butter cake to be baked.

Further the smooth constitution of the chocolate composition itself was retained.

Comparative Example 1

40 parts commercially available non-dairy cream ("Fuji Sunny Topping 200," Fuji Oil Co., Ltd., mfr.) was heated to 65° C. 60 parts commercially available sweet chocolate foodstuff of 33% oil part ("Fuji Sunny Sweet Chocolate," Fuji Oil Co., Ltd., mfr.) were added, and two-minute manual stirring with a spatula in hot water, temperature 65° C. was performed to stir-emulsify. Afterwards the mixture was cooled to 35° C. The constituents of the chocolate composition thus obtained are as follows.

| Constituent | (%) |
| --- | --- |
| Non-fat cacao part | 10.8 |
| Oil part | 37.8 |
| Moisture | 20.0 |
| Egg white (dehydrated conversion) | 0 |
| Remainder (sugars, non-fat milk solids, etc.) | 31.4 |

The chocolate composition had a smooth constitution, likewise with Embodiment 1, and solidified when cooled to 5° C. This, likewise as in Embodiment 1, was included into butter cake dough and baked (180° C., 15 min.) in an oven. Thereupon, the chocolate composition boiled during the baking and spurted out from the butter cake dough, and the butter cake could not be produced.

Embodiment 2

The commercially available non-dairy cream ("Fuji Sunny Topping 200," Fuji Oil Co., Ltd., mfr.) was heated to 65° C. Meanwhile, a 33% oil-part chocolate foodstuff, 3%-combined with commercially available powdered egg whites (Kewpie Tamago Ltd., mfr.) was manufactured according to ordinary methods. 40 parts of the commercially available non-dairy cream was added to 60 parts of the chocolate foodstuff, and two-minute manual stirring at in hot water at a temperature of 65° C. using a spatula was performed to stir-emulsify. Afterwards the mixture was cooled to 35° C. The constituents of the chocolate composition thus obtained are as follows.

| Constituent | (%) |
| --- | --- |
| Non-fat cacao part | 3.9 |
| Oil part | 37.8 |
| Moisture | 20.0 |
| Egg white (dehydrated conversion) | 1.8 |
| Remainder (sugars, non-fat milk solids, etc.) | 36.5 |

The chocolate composition had a smooth constitution as with Embodiment 1, and solidified when cooled to 5° C. The chocolate composition was included into butter cake dough likewise as in Example 1 and baked (180° C., 15 min.) in an oven. The involved chocolate composition did not gush out, and butter cake was readily produced. Further, the smooth constitution of the chocolate composition itself was retained.

Comparative Example 2

The commercially available non-dairy cream ("Fuji Sunny Topping 200," Fuji Oil Co., Ltd., mfr.) was heated to 65° C. Meanwhile, 33% oil-part chocolate foodstuff 3%-combined with commercially available "Powder Gelatin U" (Nitta Gelatin Co.) was manufactured according to ordinary methods. 40 parts of the commercially available non-dairy cream was added to 60 parts of the chocolate foodstuff and two-minute manual stirring at 65° C. using a spatula was performed to stir-emulsify. Afterwards the mixture was cooled to 35° C. The constituents of the chocolate composition thus obtained are as follows.

| Constituent | (%) |
| --- | --- |
| Non-fat cacao part | 3.9 |
| Oil part | 37.8 |
| Moisture | 20.0 |
| Eqg white (dehydrated conversion) | 0 |
| Remainder (sugars, non-fat milk solids, etc.) | 38.3 |

The chocolate composition had a smooth constitution, likewise with Embodiment 1, and solidified when cooled to 5° C. This, likewise as in Embodiment 1, was included into butter cake dough and baked (180° C., 15 min.) in an oven. In this case, the chocolate composition boiled during the baking and spurted out from the butter cake dough, and the butter cake could not be produced.

Embodiment 3

0.1 part sucrose-fatty acid ester (HLB=7) and 10 parts fresh egg white were added to 30 parts commercially available fresh cream of 45% oil part and heated to 65° C. To this 60 parts commercially available chocolate foodstuff of 33% oil part ("Fuji Sunny Milk Chocolate," Fuji Oil Co., Ltd., mfr.) was added, and 30 minute stir-emulsified at 65° C. with a propeller mixer at 200 rpm. Then homogenizing at 30 kg/cm$^2$ and cooling to 35° C., a chocolate composition having the constituents below was obtained.

| Constituent | (%) |
| --- | --- |
| Non-fat cacao part | 3.9 |
| Oil part | 33.3 |
| Moisture | 23.8 |
| Egg white (dehydrated conversion) | 1.2 |
| Remainder (sugars, non-fat milk solids, etc.) | 37.8 |

The chocolate composition was included into soft cookie dough (galette dough) and baked in an oven (210° C., 14 min.). After baking, neither deformations nor cavities were noticeable in the soft cookies, which were delicious.

Comparative Example 3

Chocolate composition obtained likewise as in Example 3, other than that it was mixed with 20% powdered skim milk dissolved in water instead of the 10 parts fresh egg whites, was included into/baked with soft cookie dough in the manner noted above. Thereupon, the chocolate composition boiled and gushed out during baking.

The constituents of the chocolate composition are as below.

| Constituent | (%) |
| --- | --- |
| Non-fat cacao part | 3.9 |
| Oil part | 33.3 |
| Moisture | 23.0 |
| Egg white (dehydrated conversion) | 0 |
| Remainder (sugars, non-fat milk solids, etc.) | 39.8 |

Embodiment 4

15 parts fresh egg white was added to 30 parts sorbitol (70-degree sugar level), and 55 parts commercially available chocolate foodstuff of 33% oil part ("Fuji Sunny Milk Chocolate," Fuji Oil Co., Ltd., mfr.) was added, and 30 minute stir-emulsified at 65° C. with the "Homomixer" (Tokushukika Kogyo, Ltd., mfr.) at 10,000 rpm, after which it was cool-hardened in a refrigerator at 5° C. The constituents of the chocolate composition thus obtained are as below.

| Constituent | (%) |
| --- | --- |
| Non-fat cacao part | 3.6 |
| Oil part | 18.2 |
| Moisture | 22.2 |
| Egg white (dehydrated conversion) | 1.8 |
| Remainder (sugars, non-fat milk solids, etc.) | 54.2 |

The chocolate composition was filled into commercially available chocolate molded into hollow balls ("Whole Kugel Sweet," Fuji Oil Co., Ltd., mfr.) and sealed up with a different, tempered chocolate. This was embedded into butter cake dough in the same manner as in Example 1 and baked, at which the chocolate composition withstood the cooking in a smooth, soft condition.

Second Mode of Embodying
Components and Production Methods

The chocolate compositions according to the second embodiment include chocolate foodstuff, starchy ingredients of 0.5 to 30 wt. %, and moisture of 10 to 30 wt. % (each wt. % is based on the weight of the entire chocolate composition).

Examples of the starchy ingredients include natural starch as corn starch, potato starch, wheat starch, and tapioca starch, and modified starches such as pre-gelatinized starches, cross-linked starch ethers, and phosphate cross-linked starches. Among them, pre-gelatinized starches are preferable in terms of smoothing the texture. The amount of the starchy ingredients is between 0.5 and 30 wt. % with respect to the entire amount of a water-containing chocolate. If the amount is less than the lower limit, a sufficient tolerance for baking is not obtained and, if it exceeds the upper limit, starch-like texture is increased and degrades the characteristic smoothness and rapid melting in the mouth.

The moisture may simply be water, however, it is preferable that the moisture is, for instance, moisture in which powdered milk or skimmed powder milk is dissolved or emulsified in water, natural fresh creams, milk, condensed milk, moisture including milk components of synthetic creams which have been developed and include animal and vegetable fats and oils, and moisture including saccharides. By using these moisture, the aqueous contents of a chocolate composition is adjusted to be in the range of between 10 and 30 wt. %. If the amount of the moisture is less than the lower limit, it is difficult to obtain an oil-in-water type water-containing chocolate and, if it exceeds the upper limit, a tolerance for heating is difficult to obtain.

Raw materials for the fat and oil include vegetable fats and oils such as cocoa butter, illippe butter, sal oil, shea butter, palm oil, palm nuclei oil, cottonseed oil, rape oil, sunflower seed oil, peanut oil, rice bran oil, corn oil, safflower oil, olive oil, kapok oil, sesame oil, and evening primrose oil, and animal fats and oils such as cream, tallow, lard, fish oil, and whale oil. Processed oils and fats produced from these by solidification, fractionation, or ester substitution such as hard butter may also be used. Moreover, these fats and oils may be added to chocolate foodstuff singularly or in a mixed form. Further, commercially available butter, margarine, shortening and so forth may be added.

In addition, an emulsifier may be added to the chocolate composition. Examples of the emulsifier include lecithin, sucrose-fatty acid ester, polyglycerin fatty acid ester, sorbitan fatty acid ester, monoglycerides, propylene glycol fatty acid ester, and organic acid monoglyceride derived from chocolates or creams. One or more of these emulsifiers may be used to increase an emulsifying stability of a chocolate composition.

Also, fruit juices or various liquors for flavoring and preservation may be added, or sweetening agents such as starch syrup may be added to adjust the sweetness. Furthermore, gums, for example xanthan gum, locust bean gum, guar gum, and gum arabic, CMC, micro-crystalline cellulose, pectin, agar, carrageenan, and gelatins may be added as a stabilizers according to need. Further, a heat-coagulating protein such as egg white may be added to further improve the tolerance for baking.

The chocolate compositions are produced by the following procedures.

After chocolate foodstuff to which starchy materials have been added is mixed with moisture, the mixture is heated to 30 to 70° C., or one of or both of the chocolate foodstuff to which starchy materials have been added and the moisture is/are heat-melted at 30 to 70° C. and then the both are mixed. As stirring methods herein, either a gentle by-hand stirring procedure, or a high-speed stirring system capable of applying strong shear forces (e.g., a stirring system in which the "Homomixer" [Tokushukika Kogyo, Ltd., mfr.] or the like is employed) may be used. A homogenizing process (5 to 150 Kg/cm$^2$) may be carried out as needed. After the emulsifying process, the mixture is cooled and then manufactured as a product. It is possible to carry out a disinfecting or sterilization process before or after the emulsifying process or the homogenizing process.

The chocolate compositions produced as above may be utilized when chocolate confectionery is manufactured. More specifically, the chocolate composition according to this embodiment is placed or coated on, or included in confectionery dough before or after baking the dough. Chocolate confectionery is produced by means of baking, steam-cooking, or deep-frying. Since the chocolate composition has an excellent tolerance for baking, steam-cooking, or deep-frying, the chocolate confectionery may be produced easily.

EXAMPLES

The second embodiment of the present invention will now be explained using embodiments and comparative examples.

Embodiment 5

20 parts triple-dilution type condensed milk ("Probest 500," Fuji Oil Co., Ltd., mfr.) and 10 parts sorbitol were heated to 65° C. 70 parts sweet chocolate foodstuff of 33% oil part in which 3% pre-gelatinized starch ("Miragel 463," A. E. Staley Mfr. Co.) had been included was added and mixed for two minutes at 40° C. using a spatula. After that the mixture was cooled to 5° C. in a refrigerator and a oil-in-water type chocolate composition having moisture of 16.7% was obtained.

The chocolate composition thus obtained was included in butter cake dough of cacao flavor and baked (160° C., 15 min.) in an oven. After the baking, the shape of the chocolate composition included in the butter cake was maintained firmly and possessed a smooth texture. When the butter cake was warmed in a microwave oven, the chocolate composition included inside thereof was melted to produce a high-grade cake.

Also, when this chocolate composition was squeezed on butter dough and baked (180° C., 12 min.), the shape of the chocolate was remained neat and did not gush out during the baking.

Comparative Example 4

A chocolate composition having 16.7% moisture was obtained using the same manner as in Example 5 except that no pre-gelatinized starch was added. The chocolate composition had a smooth texture as in Example 5. However, when the chocolate composition was included in the butter cake dough and baked (180° C., 15 min.) in an oven, the chocolate composition gushed out from the butter cake and lost its commercial value.

Also, when this chocolate composition was squeezed onto butter dough and baked (180° C., 12 min.), the chocolate composition flowed down during the baking and did not withstand the cooking, and became commercially worthless.

Embodiment 6

15 parts reduced glutinous starch syrup and 10 parts water were heated to 65° C. 70 parts milk chocolate foodstuff of 30% oil part in which 1% pre-gelatinized starch ("Miragel 463," A. E. Staley Mfr. Co.) had been included was added and mixed for two minutes at 65° C. using a spatula. Afterwards the mixture was cooled to 35° C. and a chocolate composition having moisture of 14.5% was obtained.

The chocolate composition thus obtained had a smooth texture as in Example 5 and was included in soft cookie dough (galette dough) and baked in an oven (200° C., 8 min.). The shape of the chocolate composition included in the galette dough retained well; the composition was delicious and smooth constitution without cavities. Further, the chocolate confectioneries included the soft-textured chocolate composition within, since the moisture activity is low, making them confectioneries that could be circulated at room temperature (15 to 25° C.).

Comparative Example 5

A chocolate composition having 16.7% moisture was obtained by producing a chocolate composition in the same manner as in Example 5 except that sweet chocolate foodstuff having 30% oil components to which 6% pre-gelatinized starch ("Miragel 463," A. E. Staley Mfr. Co.) had been added was used instead of the sweet chocolate foodstuff having 30% oil components to which 3% pre-gelatinized starch ("Miragel 463," A. E. Staley Mfr. Co.) had been added.

The-water-containing chocolate composition thus obtained had a heat-tolerance and its shape remained firmly when baked after having been included in butter cake dough or squeezed onto butter dough as in Example 5. However, the chocolate composition had a strong starch-like texture and the rapid melting characteristic in mouth as well as smooth texture was lost.

Embodiment 7

Triple-dilution type condensed milk ("Probest 500," Fuji Oil Co., Ltd., mfr.) (30 parts) and reduced glutinous starch syrup (10 parts) were heated to 65° C. Chocolate foodstuff having 30% oil components (60 parts) in which 2% pre-gelatinized starch ("Miragel 463," 1 A. E. Staley Mfr. Co.) had been included was added and mixed for two minutes at 40° C. using a spatula. After that the mixture was cooled to 5° C. in a refrigerator and an oil-in-water type water-containing chocolate composition having moisture of 23.5% was obtained.

This chocolate composition was included in Chinese bun in place of sweet bean paste, steamed at 90° C., and left in a warming container for seven hours. After that the chocolate composition still had a rich chocolate flavor and was very tasty. Also, its texture was very fine and smooth just like melting away.

Further, the chocolate composition was included in doughnut dough and fried (180° C., 3 min.). In this case, also, the chocolate composition was not spurted out from the doughnut dough during the frying and the doughnuts were produced easily. Moreover, the chocolate composition maintained its smooth state and its rich chocolate taste was excellent.

Comparative Example 6

Obtaining a chocolate composition having 8.5% moisture by producing a chocolate composition using the same manner as in Example 5 was attempted except that the amount of triple-dilution type condensed milk ("Probest 500," Fuji Oil Co., Ltd., mfr.) was decreased to 8 parts from 20 parts and the amount of the sweet chocolate having 30% oil components was increased to 82 parts. However, its emulsification state was unstable and could not obtain an oil-in-water type water containing chocolate composition.

Comparative Example 7

A water-containing chocolate composition having 34% moisture was obtained using the same manner as in Example 5 except that the amount of the condensed milk for 3-times dilution ("Probest 500," Fuji Oil Co., Ltd., mfr.) was increased to 30 parts from 20 parts, water (10%) was added, and the amount of the sweet chocolate having 30% oil components was decreased to 50 parts.

The chocolate composition had a smooth texture as in Example 5. However, when the chocolate composition was included in the butter cake dough and baked (160° C., 15 min.) in an oven, the chocolate composition gushed out from the butter cake and lost its commercial value.

Also, when this chocolate composition was squeezed on butter dough and baked (180° C., 12 min.), the chocolate composition flowed out during the baking and the shape of the chocolate did not remain. Hence it lost its commercial value.

Comparative Example 8

An oil-in-water type water-containing chocolate composition having 14.5% moisture was obtained using the same manner as in Example 6 except that no pre-gelatinized starch was used.

The chocolate composition had a smooth texture as in Example 6. However, when the chocolate composition was included in the soft cookie dough (galette dough) and baked (200° C., 8 min.) in an oven, the chocolate composition included in the galette dough lost its smoothness.

Comparative Example 9

An oil-in-water type water-containing chocolate composition having 23.5% moisture was obtained using the same manner as in Example 7 except that no pre-gelatinized starch was used.

It was tried to produce a chocolate confectionery by including the chocolate composition in Chinese bun in place of a sweet bean paste. However, the chocolate composition was flowed out from the dough during the steaming and lost its commercial value.

Also, the chocolate composition was included in doughnut dough and fried (180° C., 3 min.). However, the chocolate composition was spurted out from the dough during the frying and lost its commercial value.

Third Mode of Embodying

The chocolate compositions according to the third embodiment includes starchy materials of 0.1 to 30% (each wt. % is relative to the entire chocolate.composition), water of 0.5 to 5%, an expanding agent of 0.5 to 5%, and fat and oil of 20 to 50%.

If the amount of the starchy materials is too little, the shape of the composition tends not to be maintained during a baking process (e.g. a direct heating, steam-heating, high-frequency heating and so forth) and its oil components tend to be separated. On the other hand, if the amount of the starchy material is too much, the resultant composition absorbs a large amount of water and lowers the degree of water evaporation during the baking and the high-frequency heating. Accordingly, the production efficiency is lowered and a texture like baked confectionery is difficult to obtain. Thus, the preferred amount of the starchy materials in chocolate foodstuff is in the range between 1 and 3%.

Examples of the starchy materials used in this embodiment include natural starch as corn starch, potato starch, wheat starch, tapioca starch, and flour that is a raw material thereof, and modified starches such as pre-gelatinized starches, cross-linked starch ethers, and phosphate cross-linked starches. Especially, modified starches are preferable in terms of making texture smooth (i.e., melts excellently in mouth with little powdery feeling and roughness) after a baking or high-frequency heating process. Among the modified starch, the pre-gelatinized starch is excellent in that it produces the best smooth texture.

As for water, if the amount of water is too little, a baked product obtained by heating directly shows a significant dry and brittle feeling and, if it is too large, water remains in the product after baking and makes the product sticky. Hence, the easiness in handling the product is reduced and it is difficult to obtain a predetermined shape of the product as it attaches to hands or equipment. Accordingly, the preferred amount of water in chocolate foodstuff is between 1 and 5%.

The addition of an expanding agent is not essential and it may be added optionally of course, if a certain amount, for instance 1 to 3% of an expanding agent is added to chocolate foodstuff, the texture of a product is improved. Any known baking powder used for confectionery bread may be used as the expanding agent.

The amount of the fat and oil may be in the range of general use. The preferred range is between 30 and 45% with respect to the amount of chocolate composition. Cacao components (i.e., chocolate taste material of cacao mass, cacao powder and so on), milk solid components (i.e., powdered milk products such as non-fat powdered milk and powdered skim milk), saccharides, vegetable fats, emulsifiers, and components known to be used for chocolate components (i.e., various fruit powders, grains, and nuts) may also be included. Moreover, these components are melted or dispersed in chocolate foodstuff, which has been obtained by melting a completed chocolate product, or made as a heat-melted mixture containing each component, and, thereafter, formed and solidified. Any one of mold forming (no need to subject to tempering, though it is preferable to rapidly cool down and subjected to cutting), rod-shape forming, and sheet forming may be used. This can be done by manually or using machines.

A chocolate confectionery may be produced by baking (for instance, direct-heating, high-frequency heating, steam-cooking and so on) the chocolate composition singularly or in the form contained between other confectionery dough.

The thickness of the chocolate composition when baked is between 5 and 20 mm, preferably between 0.5 and 15 mm, if baked singularly. When contained between the other confectionery dough, its thickness is reduced so that it is suitable for the manner of baking and heating time of the confectionery dough. In general, if it is too thick, water does not evaporate and takes a longer heating time for baking which lowers the operability. On the other hand, if it is too thin, the resulting product tends to be scorched especially when the composition is baked singularly.

If direct heat is used, the chocolate foodstuff is baked until the water contained in the chocolate foodstuff is scattered and a light texture of a baked confectionery is obtained. When baked in an oven using direct heat, the composition is baked at a temperature in the range between about 180 and 210° C. using a conventional method. It is possible to carry out a dry-baking at a low temperature, for instance, at about 100° C. after the direct-heat baking in order to adjust the water contents.

It is possible to intermittently perform the high-frequency heating in order to control the heating temperature. It is easier to obtain a preferred roast taste by baking rather than by using the high-frequency heating. Although the high-frequency heating may be typically carried out by using a microwave oven with intermittence to control the heating temperature, a preferred roast taste is easier to obtain by baking as compared to the high-frequency heating.

EXAMPLES

The third embodiment of the present invention will now be explained using examples.

Embodiment 8

"Couverture Sweet" (Fuji Oil Co., Ltd., mfr.) (100 parts) was melted at 50° C. and "Miragel Starch" (an pre-gelatinized starch, A. E. Staley Mfr. Co.) (1 part) and baking powder ("Aikoku Baking Powder," Aikoku Sangyo Co.) (1 part) were added and mixed to be homogeneously dispersed. Then, the condensed milk for 3-times dilution ("Probest 500," Fuji Oil Co., Ltd., mfr.) (3.3 parts) and a reduced starch saccharifide ("Amameal," Towa Kasei Kogyo Co.) (1.7 parts) were heated to 50° C. and mixed with the above-mentioned melt to produce a chocolate composition.

The chocolate composition thus obtained exhibited plasticity at 40° C. and had an excellent operability (i.e., a forming capacity to optional shape and plasticity without being sticky) (2.6% moisture and about 40% oil components). The chocolate composition was subjected to a mold forming of 10 mm thickness and a rod-shape forming of 12 mm diameter and respective formed products were obtained.

After that both of the formed products were placed on a plate and baked in an oven using direct heat to obtain chocolate confectionery. The condition of the direct heating was, in case of the mold forming, four min. baking at 210° C. and subsequent 10 min. drying at 100° C., and, in case of the rod-shape forming, four min. baking at 210° C. Both of the resultant chocolate confectionery had a light texture like cookies and ready to be soften in mouth leaving an excellent melting feeling. Also, both of the confectionery possessed fine chocolate taste.

On the other hand, confectionery was produced without adding the baking powder. Although the degree of baking was a little insufficient when the same baking time as above was used and the resultant confectionery was densely produced and had a harder texture as the one mentioned above, it basically had an excellent texture like a baked confectionery.

Note that all of these chocolate confectionery are in conformity with Japanese "Chocolate Standards" and excellent in cacao flavor.

Embodiment 9

A chocolate confectionery was obtained using the same manner as in Example 8 except that "Chocolate MSRD-20" (Fuji Oil Co., Ltd., mfr.) (100 parts) was used instead of "Couverture Sweet" (Fuji Oil Co., Ltd., mfr.) (100 parts).

The chocolate confectionery had a light texture like cookies as in Example 8 and ready to be soften in mouth leaving an excellent melting feeling.

Embodiment 10

A chocolate confectionery was obtained using the same manner as in Example 8 except that corn starch was used instead of pre-gelatinized starch in Example 8.

Although the chocolate confectionery had a little powdery feeling and roughness, it showed a crispy light texture like a baked confectionery totally different from a conventional chocolate confectionery having a snapping characteristic.

Embodiment 11

The chocolate composition produced in Example 8 was rolled so that its thickness became 2 mm using a sheeter and cut. This was placed on soft biscuit dough (2 mm thickness) and baked in an oven (200° C., 5 min.) to produce a chocolate confectionery having two layers of biscuit and baked chocolate.

The chocolate confectionery had a crispy light texture like a baked confectionery totally different from a conventional chocolate confectionery having a snapping characteristic.

Embodiment 12

"Couverture Sweet" (Fuji Oil Co., Ltd., mfr.) (100 parts) was melted at 50° C. and "Miragel Starch" (an α-type starch, A. E. Staley Mfr. Co.) (1 part), baking powder ("Aikoku Baking Powder," Aikoku Sangyo Co.) (1 part), and flour (less-gluten flour) (10 parts) were added and homogeneously dispersed. Then, the condensed milk for 3-times dilution ("Probest 500," Fuji Oil Co., Ltd., mfr.) (4 parts) and the reduced starch saccharide ("Amameal," Towa Kasei Kogyo Co.) (2 parts) were heated to 50° C. and mixed with the above-mentioned melt. The chocolate foodstuff thus obtained showed a plasticity at 40° C. and had an excellent operability (i.e., a forming capacity to optional shape and plasticity without being sticky) (aqueous and oil components in the chocolate foodstuff was 5.6% and 33%, respectively). The chocolate foodstuff was rolled using a rod so that its thickness became 10 mm and cut to 30×30 mm using a knife.

This was placed on a plate and baked in an oven using direct heat. The condition of the direct heating was 180° C. and five minutes.

By using the same procedure except that the amount of the flour (less gluten flour) was increased to 20 parts, a baked product was obtained. Although both of them had no problem in terms of a baked confectionery like texture, the product in which 10 parts of flour (less gluten flour) was used was superior in its chocolate savor.

Fourth Mode of Embodying

The chocolate compositions according to the fourth embodiment includes starchy materials of 0.1 to 30%, heat-coagulating proteins of 0.1 to 5%, moisture of 11 to 30%, an expanding agent of 0 to 3%, and fat and oil of 10 to 40%.

As in the third embodiment, the preferred amount of the starchy materials in a chocolate composition is in the range between 1 and 3% with respect to the chocolate composition, taking into account a shape-keeping characteristic during a baking procedure and a separation of oil components. Also, the types of the starchy materials used are the same as those in Example 3.

If the amount of the heat-coagulating proteins added to a chocolate composition is too little, it becomes difficult to prevent the water-containing dough from being scorched and a porous texture of a baked confectionery is difficult to produce. Also, the oil components tend to be separated. On the other hand, if the amount of the heat-coagulating proteins added to a chocolate composition is too much, the resultant composition absorbs a large amount of water and lowers the degree of water evaporation during a baking procedure. Accordingly, the production efficiency is lowered and a texture like semi-fresh confectionery is difficult to obtain. That is, gel strength derived from the starchy material appears strongly to cause a sticky texture and a soft wet texture like semi-fresh confectionery is difficult to obtain. Accordingly, the preferred amount of the heat-coagulating proteins in a chocolate composition is in the range between 0.5 and 3%.

Examples of the heat-coagulating proteins include dried egg white, soy bean protein and so forth. These may be used in a water-containing state (in such case, the amount of a heat-coagulating protein is converted to anhydride).

As for water, if the amount thereof is too little, a baked product obtained by heating directly shows a significant dry and brittle feeling and, if it is too large, the shape of a baked product tends not to be maintained. The preferred amount of water in chocolate composition is in the range between 13 and 25%.

The addition of an expanding agent is not essential and it may be added optionally as mentioned in Example 3. If a certain amount, for instance 0.1 to 3% of an expanding agent is added to a chocolate composition, the texture of a product is improved. Although the use of an expanding agent is effective in giving dough used for producing a baked product a soft wet texture, it is sometimes required not to use an expanding agent since, for instance, when dough is put in an editable container and baked in an opened state, it may expand too much and come out of the container.

The amount of the fat and oil may be in the range of general use. If the amount is too little, it causes brittle feeling and a product does not melt smoothly. If the amount is too large, on the other hand, a separation of oil components tend to be caused after a baking procedure. The preferred range thereof in a chocolate composition is between 15 and 35%.

Other factors are the same as those in the third embodiment.

EMBODIMENTS

The fourth embodiment of the present invention will now be explained by using examples and comparative examples.

Embodiment 13

Pure chocolate foodstuff having 34% oil components ("Couverture Sweet" (Fuji Oil Co., Ltd., mfr.) (100 parts) was melted at 50° C. and an pre-gelatinized starch ("Miragel Starch," A. E. Staley Mfr. Co.) (3 parts), baking powder ("Aikoku Baking Powder," Aikoku Sangyo Co.) (1 part), and dried egg white ("Dried Egg White W." Kewpie Co.) (2 parts) were added and mixed to be homogeneously dispersed. Then, a condensed milk for 3-times dilution ("Probest 500," Fuji Oil Co., Ltd., mfr.) (27 parts) and a reduced starch saccharide ("Amameal," Towa Kasei Kogyo Co.) (13 parts) were heated to 50° C. and mixed with the above-mentioned melt.

The chocolate composition thus obtained showed a plasticity at 40° C. and had an excellent operability (16.0% moisture and about 23% oil components).

The chocolate composition was put in a container (tray) of 15 mm thickness and the container was put on a plate to be baked in an oven (180° C., 15 min.) using direct heat. The chocolate composition in the confectionery thus obtained had a texture like a baked confectionery. Also, it had a new texture in which texture of a semi-fresh confectionery is mixed with a soft melt feeling characteristic of chocolate. Moreover, the chocolate savor thereof was also excellent.

On the other hand, confectionery was produced without adding a baking powder. Although the degree of baking thereof was a little insufficient when the same baking time as above was used and the resultant confectionery was densely produced and had a harder texture as compared with the one mentioned above, it basically had an excellent texture like a baked confectionery.

Note that all of these chocolate confectionery are in conformity with Japanese "Chocolate Standards".

Embodiment 14

A chocolate composition was obtained by using the same procedure as in Example 12 except that semi-chocolate foodstuff having 41% oil components ("Chocolate MSRD-20," Fuji Oil-Co., Ltd., mfr.) (100 parts) was used instead of the pure chocolate foodstuff having 34% oil components ("Couverture Sweet" (Fuji Oil Co., Ltd., mfr.). Then, the obtained chocolate composition was directly heated to produce chocolate confectionery.

The chocolate confectionery thus obtained was a new and excellent product having, similar to the one in Example 12, both semi-fresh confectionery texture with baked confectionery portion and soft melt feeling in mouth like chocolate (16.0% moisture and about 27% in the chocolate composition).

Embodiment 15

A chocolate composition was obtained by using the same procedure as in Example 12 except that corn starch was used instead of the pre-gelatinized starch.

Although the chocolate confectionery had a little powdery feeling and roughness as compared with the one obtained in Example 12, it was a product having baked confectionery like portion and semi-fresh texture which is totally different from a conventional chocolate confectionery.

Comparative Example 10

A chocolate composition was obtained by using the same procedure as in Example 12 except that no dried egg white was used (16.2% moisture and about 23% oil components) and this was directly heated to produce chocolate confectionery. This chocolate confectionery could not form a frame suitable for baked confectionery and, hence, a volume (i.e., height) could not be obtained. Accordingly, porous portions like semi-fresh confectionery could not be produced and, hence, texture like semi-fresh confectionery could not be obtained. Also, the loss of oil during a baking procedure was large.

Embodiment 16

A chocolate composition was obtained by using the same procedure as in Example 12 except that a condensed milk for 3-times dilution ("Probest 500," Fuji Oil Co., Ltd., mfr.) (50 parts) and a reduced starch saccharide ("Amameal," Towa Kasei Kogyo Co.) (25 parts) were used (23.0% moisture and about 18% oil components).

The chocolate composition was put in a container (tray) of 30 mm depth and 50 mm width and the container was put on a plate. After that warmed water was put in the container to be a height of 10 mm in order to perform steam cooking (160° C., 30 min.) to produce chocolate confectionery. The chocolate confectionery thus obtained had a baked confectionery-like portion in the chocolate and possessed a new texture in which semi-fresh confectionery texture is mixed with soft melt feeling in mouth like chocolate. Also, the confectionery had an excellent chocolate flavor.

Comparative Example 11

Pure chocolate foodstuff having 34% oil components ("Couverture Sweet" (Fuji Oil Co., Ltd., mfr.) (100 parts) was melted at 50° C. and an pre-gelatinized starch ("Miragel Starch," A. E. Staley Mfr. Co.) (3 parts), a baking powder ("Aikoku Baking Powder," and Aikoku Sangyo Co.) (1 part) were added and mixed to be homogeneously dispersed. Then, triple-dilution condensed milk ("Probest 500," Fuji Oil Co., Ltd., mfr.) (3.3 parts) and a reduced starch saccharide ("Amameal," Towa Kasei Kogyo Co.) (1.7 parts) were heated to 50° C. and mixed with the above-mentioned melt to obtain a chocolate composition (2.6% moisture and about 40% oil components). The chocolate composition thus obtained exhibited plasticity at 40° C.

The chocolate composition was formed in a mold of 10 mm thickness and the product obtained was baked in an oven (210° C., 4 min.) using direct heat. The baked product thus obtained had a cookie-like crispy texture, but a semi-fresh confectionery like texture could not be obtained.

Comparative Example 12

A chocolate composition was obtained by using the same procedure as in Example 12 except that triple-dilution condensed milk ("Probest 500," Fuji Oil Co., Ltd., mfr.) (100 parts) and a reduced starch saccharide ("Amameal," Towa Kasei Kogyo Co.) (50 parts) were used (31.8% moisture and about 13% oil components). The chocolate composition was put in a container (tray) of 15 mm thickness as in Example 12, and the container was placed on a plate to be baked in an oven (180° C., 25 min.) using direct heat.

The baked product thus obtained had a bad shape-maintaining property and could not obtain a texture like a baked confectionery. Also, when the amount of the dried egg white was increased to 5% in the above-mentioned ingredients, a baked confectionery like texture could not be obtained although the shape-maintaining property was improved.

Potential Industrial Utility

According to the present invention, as mentioned above, it becomes possible to provide a ganache type chocolate composition having an excellent inclusion (mechanical) property when it is used for a baked confectionery. Also, by baking this chocolate composition separately, chocolate confectionery having new texture may be provided.

What is claimed is:

1. A method of producing a chocolate confection, comprising the steps of:

producing an oil-in-water, water-containing chocolate composition comprising 1 to 30 wt % non-fat cacao, 10 to 50 wt % fats and/or oils, 4 to 40% wt % of moisture, and 0.2 to 10 wt % of a heat-coagulating protein;

placing the chocolate composition into or onto an uncooked batter or dough; and cooking the batter or dough.

2. The method set forth in claim 1, wherein the amount of non-fat cacao is 2 to 15 wt %.

3. The method set forth in claim 1, wherein the amount of moisture is 15 to 25 wt %.

4. The method set forth in claim 1, wherein the amount of heat-coaguaing protein is 0.5 to 3.5 wt %.

5. The method set forth in claim 1, wherein the heat-coagulating protein is albumen.

6. A method of producing a chocolate confection, comprising the steps of:

producing an oil-in-water, water-containing chocolate composition comprising 1 to 30 wt % non-fat cacao, 10 to 50 wt % fats and/or oils, 10 to 30 wt % moisture, and 0.5 to 30 wt % of a starch material;

placing the chocolate composition into or onto an uncooked batter or dough; and cooking the batter or dough.

7. The method set forth in claim 6, wherein the starch material is corn starch, potato starch, wheat starch, tapioca starch, pre-gelatinized starch, cross-linked starch ether, or phosphate cross-linked starch.

8. A method of producing a chocolate confection, comprising the steps of:

producing an oil-in-water, water-containing chocolate composition comprising 1 to 30 wt % non-fat cacao, 10 to 50 wt % fats and/or oils, 0.5 to 10 wt % moisture, and 0.1 to 30 wt % of a starch material; and directly baking or steam-baking the chocolate composition.

9. The method set forth in claim 8, wherein the amount of starch material is 1 to 3 wt %.

10. The method set forth in claim 8, wherein the starch material is corn starch, potato starch, wheat starch, tapioca starch, pre-gelatinized starch cross-linked starch ether, or phosphate cross-linked starch.

11. A method of producing a chocolate confection, comprising the steps of:

producing an oil-in-water, water-containing chocolate composition comprising 1 to 30 wt % non-fat cacao, 10 to 50 wt % fats and/or oils, 11 to 30 wt % moisture, 0.1 to 30 wt % of a starch material, and 0.1 to 5 wt % of a heat-coagulating protein; and directly baking or steam-baking the chocolate composition.

12. The method set forth in claim 11, wherein the amount of starch material is 1 to 3 wt %.

13. The method set forth in claim 11, wherein the starch material is corn starch, potato starch, wheat starch, tapioca starch, pre-gelatinized starch, cross-linked starch ether, or phosphate cross-linked starch.

14. The method set forth in claim 11, wherein the heat-coagulating protein is albumen.

* * * * *